United States Patent
Shotwell

[11] 3,823,619
[45] July 16, 1974

[54] MULTI-PLATE VIBRATION DAMPER

[75] Inventor: Daniel B. Shotwell, Washington, Ill.

[73] Assignee: Caterpillar Tractor Co., Peoria, Ill.

[22] Filed: Oct. 27, 1972

[21] Appl. No.: 301,590

[52] U.S. Cl. .................................. 74/574, 188/1 B
[51] Int. Cl. ............................................. F16f 15/12
[58] Field of Search ....... 74/574; 188/1 B; 192/58 B

[56] References Cited
UNITED STATES PATENTS

| | | | |
|---|---|---|---|
| 2,863,542 | 12/1958 | Kelsey | 192/58 B |
| 2,939,338 | 6/1960 | Troyer | 74/574 |
| 3,285,096 | 11/1966 | O'Connor | 74/574 |

*Primary Examiner*—Samuel Scott
*Assistant Examiner*—F. D. Shoemaker
*Attorney, Agent, or Firm*—Phillips, Moore, Weissenberger, Lempio & Strabala

[57] ABSTRACT

A vibration damper comprises a housing having an annular weight secured between radially disposed side plates. An outer set of annular, cup-shaped shear inducing members comprise outer flanges secured between the weight and the side plates and inner shear discs projecting radially inwardly into an annular chamber formed in the housing. An inner set of similar shear inducing members have their inner flanges secured to a centrally disposed plate, attached to the housing, and their outer shear discs interleaved with the inner shear discs of the outer set of shear inducing members to provide clearances therebetween. The housing is at least partially filled with a damping fluid, such as a highly viscous silicone fluid, which enters the clearances during damper operation.

11 Claims, 1 Drawing Figure

PATENTED JUL 16 1974　　　　　　　　　　　3,823,619
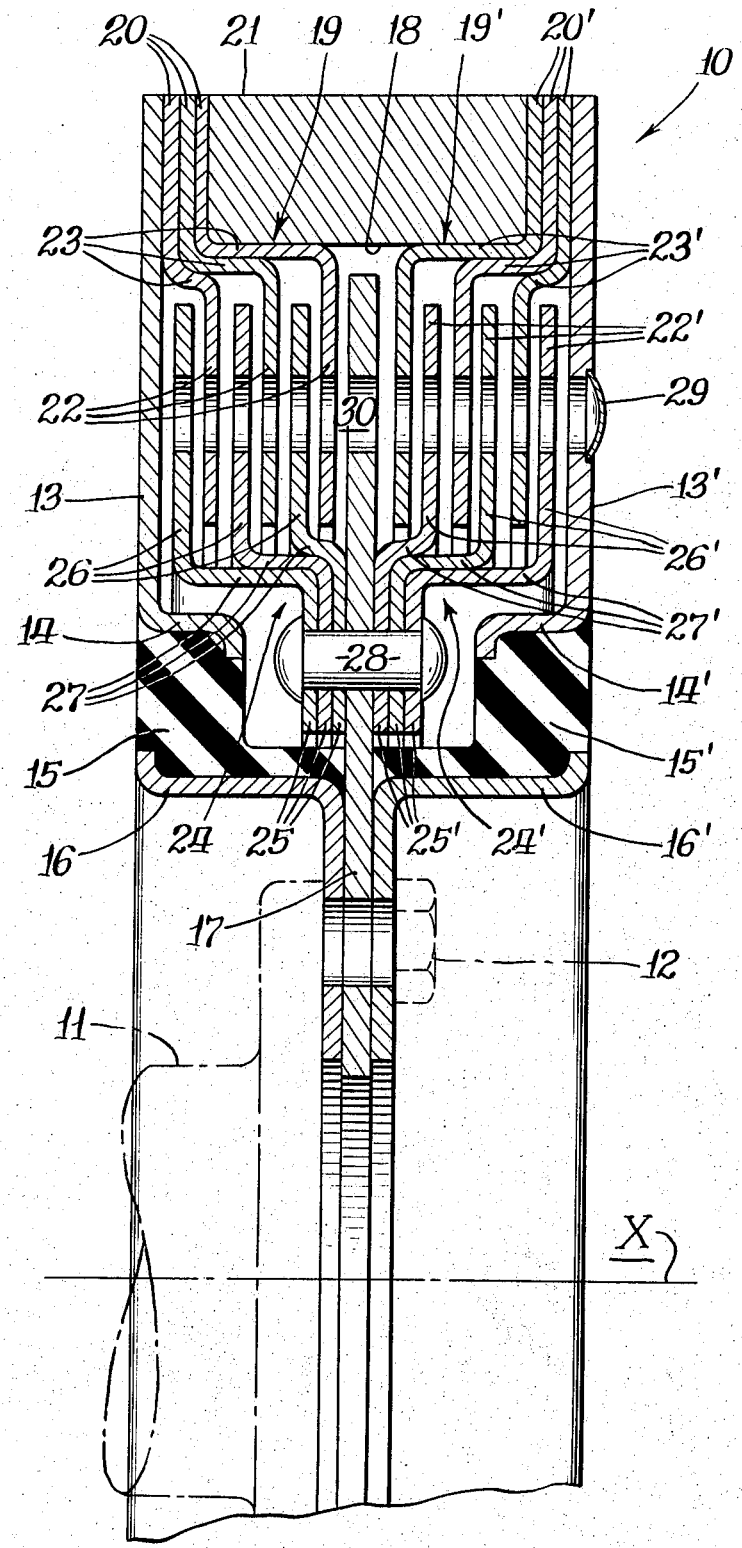

MULTI-PLATE VIBRATION DAMPER

BACKGROUND OF THE INVENTION

Many types of torsional vibrational dampers have been proposed for attachment to the crankshaft of an internal combustion engine to dampen vibrations occasioned during operation thereof. Many such dampers employ one or more annular discs which provide a shearing surface cooperating with a damping fluid, such as silicone, retained in the housing to provide the damping function. Examples of such dampers are disclosed in U.S. Pat. Nos. 2,939,338 and 3,410,369 and British Pat. No. 1,209,357.

SUMMARY OF THIS INVENTION

An object of this invention is to provide a compact, economical, durable and closely balanced multi-plate vibration damper adapted for use over a wide range of damper applications. The damper comprises a housing defining a closed, annular chamber adapted to contain a damping fluid, such as silicone, therein. A first set of annular cup-shaped shear inducing members comprise inner shear discs projecting into the chamber in interleaved relationship with respect to outer shear discs of a second set of similar shear inducing members. The interleaved inner and outer shear discs are axially spaced with respect to each other to define shear inducing clearances therebetween to cooperate with the damping fluid for vibration damping purposes.

BRIEF DESCRIPTION OF THE DRAWING

Other objects of this invention will become apparent from the following description and accompanying drawing which is a cross sectional view of a multi-plate vibration damper embodying this invention.

DETAILED DESCRIPTION

The drawing illustrates a vibration damper 10, disposed on a central rotational axis X thereof, adapted to be attached to a crankshaft 11 of an internal combustion engine by circumferentially disposed bolts 12. The damper has a housing comprising radially disposed annular side plates 13 and 13' terminating at their lower ends at flanges 14 and 14', respectively. The flanges are bonded to annular elastomeric (e.g., rubber) seals 15 and 15' which are, in turn, bonded to support members 16 and 16', respectively. A centrally disposed disc-shaped plate 17 is secured between the support members and extends radially outwardly into a closed and sealed annular chamber 18 defined in the housing to contain a damping fluid, such as silicone, therein.

A first or outer set of annular, cup-shaped shear inducing members 19 each comprise an outer flange 20 extending radially outwardly from axis X in secured relationship between plate 13 and an annular weight 21. Each shear inducing member, preferably formed as a sheet metal stamping, further comprises an inner shear disc 22 extending radially inwardly towards the axis and into chamber 18 and an outer hub 23 extending axially in the direction of the axis. Each hub connects an outer flange and an inner shear disc together in axially spaced, offset relationship relative to each other. In addition, each of the inner shear discs are axially spaced relative to the next adjacent inner shear disc.

A second or inner set of annular, cup-shpaed shear inducing members 24 are formed in a like manner. In particular, each member 24 comprises an inner flange 25 extending radially inwardly towards axis X, an outer shear disc 26 extending radially outwardly away from the axis and into chamber 18 and an inner hub 27 extending axially in the direction of the axis to connect the inner flange and outer shear disc together in axially spaced, offset relationship. Inner shear discs 22 are interleaved and axially spaced with respect to outer shear discs 26 to define pre-calibrated (e.g., 0.070 inch) shear inducing clearances therebetween. Such clearances are somewhat wider and therefore not as critical as conventional ones to lower manufacturing costs, avoid rubbing contact between the shear discs and to facilitate the use of silicone damping fluid within its shear strength capabilities.

Third and fourth sets of annular, cup-shaped shear inducing members 19' and 24', spaced axially from the first and second sets, are constructed and arranged in a similar but opposite manner and thus have their constructions depicted by identical numerals, accompanied by a prime symbol ('). Inner flanges 25 and 25' of the first and fourth sets of shear inducing members are secured on opposite sides of plate 17 by circumferentially disposed rivets 28 (one shown). Chamber 18 may be at least partially filled with a damping fluid, such as a highly viscous silicone fluid, through diametrically opposed air purging ports (one shown), each normally covered by a detachable expansion and sealing plug 29.

Two series of axially aligned apertures are formed through shear discs 22, 22', 26 and 26' and plate 17 to define diametrically opposed passage means 30 (one shown) to aid in filling and distribution of the damping fluid during damper operation. Such damping fluid preferably comprises silicone having a viscosity of at least 200,000 centistokes to provide the combined tuning and damping desiderata with the large shear surfaces formed on the shear discs. One size of the above-described damper may be adapted for use with engines having a wide range of natural frequencies merely by varying the volume of damping fluid in chamber 18 and/or by varying the viscosity of such damping fluid.

What is claimed is:

1. A vibration damper disposed on a rotational axis thereof comprising
   a housing defining a closed, annular chamber adapted to contain a damping fluid therein,
   a first set of annular, cup-shaped shear inducing members each comprising an outer flange extending radially outwardly from said axis and secured to said housing, an inner shear disc extending radially inwardly towards said axis and into said chamber and an outer hub extending axially in the direction of said axis connecting said outer flange and said inner shear disc together in axially spaced, offset relationship relative to each other, each of said inner shear discs being axially spaced relative to the next adjacent inner shear disc, and
   a second set of annular, cup-shaped shear inducing members each comprising an inner flange extending radially inwardly towards each axis, an outer shear disc extending radially outwardly away from said axis and into said chamber and an inner hub extending axially in the direction of said axis connecting said inner flange and said outer shear disc together in axially offset relationship relative to each other, the inner shear discs of said first set of shear inducing members being interleaved and axially spaced with respect to the outer shear discs of said second set of shear inducing members to define shear inducing clearances therebetween.

2. The damper of claim 1 wherein said housing comprises an annular weight and an annular side plate having said outer flanges secured therebetween.

3. The damper of claim 2 wherein said housing further comprises a support member and an elastomeric seal secured between said support member and said side plate.

4. The damper of claim 3 further comprising a disc-shaped support, adapted for attachment to the crankshaft of an internal combustion engine, extending radially outwardly from said axis and into said chamber, said support member and the inner flanges of said second set of shear inducing members secured to said support plate.

5. The damper of claim 4 further comprising third and fourth sets of said annular, cup-shaped shear inducing members spaced axially from said first and second sets of shear inducing members, respectively.

6. In a vibration damper, disposed on a rotational axis thereof, having a housing defining a closed, annular chamber adapted to contain a damping fluid therein and a plurality of interleaved shear inducing members, the invention wherein said shear inducing members are each cup-shaped to comprise a radially extending flange secured to said housing, a radially extending shear disc projecting into the chamber of said housing and interleaved with respect to other ones of said shear discs, and an axially extending hub connecting said flange and shear disc together in axially spaced, offset relationship relative to each other.

7. A vibration damper defining an annular chamber therein and disposed on a rotational axis thereof comprising
an annular weight,
a pair of annular side plates disposed on each axial side of said weight,
axially spaced outer sets of shear inducing members having outer peripheral flanges thereof secured between said weight and respective ones of said side plates and inner shear discs extending radially inwardly towards said axis and into said chamber,
inner sets of shear inducing members having outer shear discs extending radially outwardly away from said axis and into said chamber in interleaved and axially spaced relationship relative to said inner shear discs to define shear inducing clearances therebetween and
means attaching said inner sets of shear inducing members to said side plates.

8. The damper of claim 7 wherein said means comprises a pair of support members and an elastomeric seal secured between each of said support members and a respective one of said side plates.

9. The damper of claim 8 wherein said means further comprises a disc-shaped support, adapted for attachment to the crankshaft of an internal combustion engine, extending radially outwardly from said axis and into said chamber, and wherein said inner sets of shear inducing members further comprise inner flanges secured to said disc-shaped support.

10. The damper of claim 9 wherein said support members are secured to opposite sides of said disc-shaped support.

11. The damper of claim 9 wherein two sets of each of said outer and inner shear inducing members are positioned axially on opposite sides of said disc-shaped support.

* * * * *